United States Patent
Jeong et al.

(10) Patent No.: US 7,488,362 B2
(45) Date of Patent: Feb. 10, 2009

(54) DUST COLLECTION ASSEMBLY OF VACUUM CLEANER

(75) Inventors: Hoi Kil Jeong, Changwon-si (KR); Man Tae Hwang, Changwon-si (KR); Young Ho Kim, Changwon-si (KR); Jung Bae Hwang, Daegu (KR); Min Park, Busan (KR)

(73) Assignee: LG Electronics Inc., Seoul (KR)

( * ) Notice: Subject to any disclaimer, the term of this patent is extended or adjusted under 35 U.S.C. 154(b) by 546 days.

(21) Appl. No.: 11/232,856

(22) Filed: Sep. 23, 2005

(65) Prior Publication Data

US 2006/0137304 A1 Jun. 29, 2006

(30) Foreign Application Priority Data

Dec. 29, 2004 (KR) ............... 10-2004-0114720

(51) Int. Cl.
*B01D 45/12* (2006.01)
*B01D 50/00* (2006.01)

(52) U.S. Cl. .................. 55/337; 55/343; 55/349; 55/429; 55/DIG. 3

(58) Field of Classification Search ............ 55/337, 55/346, 349, 429, 433, DIG. 3, 343
See application file for complete search history.

(56) References Cited

U.S. PATENT DOCUMENTS

| 3,425,192 | A | 2/1969 | Davis |
| 5,779,745 | A | 7/1998 | Kilström |
| 7,273,506 | B2 * | 9/2007 | Oh et al. ................... 55/343 |
| 2005/0050678 | A1 | 3/2005 | Oh et al. |

FOREIGN PATENT DOCUMENTS

| DE | 201 09 699 U1 | 10/2001 |
| DE | 20109699 U1 | 11/2001 |
| WO | WO 00/74548 A1 | 12/2000 |

* cited by examiner

*Primary Examiner*—Robert A Hopkins
(74) *Attorney, Agent, or Firm*—McKenna Long & Aldridge LLP (57) ABSTRACT

A dust collection assembly of a vacuum cleaner is provided. The dust collection assembly includes a dust collecting box, a filter, a flow guide unit, an exhaust guider, and an upper cover. The dust collecting box and the flow guide unit are integrally formed in a single body. The dust collecting box includes a first and second dust collecting spaces for collecting foreign objects. The filter is disposed in the inside of the dust collecting space to primarily filter foreign objects during operation of a cyclone. The flow guide unit guides airflow and has small cyclones integrally formed therein, for secondarily filtering the foreign objects in air. The exhaust guider guides airflow and has a plurality of discharge holes through which air filtered by the small cyclone flows. The upper cover is disposed on the upper side of the exhaust guider.

17 Claims, 5 Drawing Sheets

DUST COLLECTION ASSEMBLY OF VACUUM CLEANER

BACKGROUND OF THE INVENTION

1. Field of the Invention

The present invention relates to a vacuum cleaner, and more particularly, to a dust collection assembly of a vacuum cleaner capable of improving dust collecting efficiency by serially installing the first dust collecting member and the second dust collecting member for filtering foreign objects contained in air and being simply manufactured.

2. Description of the Related Art

A vacuum cleaner is used to clean a room or other spaces by sucking air containing foreign objects and filtering the foreign object using vacuum pressure generated therein.

In the meantime, the vacuum cleaner has a dust collecting unit of a predetermined shape mounted within the vacuum cleaner and a filtering device installed in the dust collecting unit, for filtering foreign objects in order to filter foreign objects in sucked air.

The typical filter is formed of porous material so that the foreign objects are filtered while the air containing the foreign objects passes through the filter.

However, since it is inconvenient to reuse the filter formed of the porous material and it is difficult to clean the filter, in recent years, a cyclone unit has been widely used. However, the cyclone unit has a problem in that it cannot filter microscale foreign objects. Therefore, an additional porous filter formed of the porous material has been associated with the cyclone unit.

However, when the porous filter is combined with the cyclone unit, the problem of periodically cleaning the filter still remains. When the foreign objects are implanted in the porous filter, an airflow rate is reduced, thereby deteriorating the operational efficiency of the vacuum cleaner.

To solve above problems, a solution in which a plurality of cyclones are produced in the inside of a single dust collecting unit instead of using a porous filter in the inside of the dust collecting unit to allow even fine dusts to be completely filtered, has been suggested recently. Such a dust collecting unit may be called a multi-cyclone dust collecting unit.

In the meantime, since airflow is switched to several directions to produce a plurality of cyclones in the inside of the dust collecting, the inner structure of the multi-cyclone dust collecting unit is complicated. Therefore, it is general that a plurality of parts are coupled to each other to manufacture the multi-cyclone dust collecting unit.

However, when the dust collecting unit is manufactured by a process of assembling a plurality of parts, the possibility that defect occurs in the finished product increases as much as that and a labor of an operator increases.

SUMMARY OF THE INVENTION

Accordingly, the present invention is directed to a dust collection assembly of a vacuum cleaner that substantially obviates one or more problems due to limitations and disadvantages of the related art.

An object of the present invention is to provide a dust collection assembly of a vacuum cleaner capable of improving dust collecting efficiency by filtering small and large foreign objects in air using cyclone flow of a large diameter and cyclone flow of a small diameter.

Another object of the present invention is to provide a dust collection assembly of a vacuum cleaner having simple construction by optimizing arrangement of cyclone flow to simplify a dust collection assembly.

A further another object of the present invention is to provide a dust collection assembly of a vacuum cleaner capable of reducing manufacturing cost and enhancing convenience in an assembling process by reducing the number of parts constituting a dust collection assembly and making coupling between the parts convenient.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a dust collection assembly of a vacuum cleaner, including: a dust collecting box having a first dust collecting space and a second dust collecting space for collecting foreign objects therein; a filter disposed in an inside of the first dust collecting space, for primarily filtering foreign objects during cyclone airflow in the first dust collecting space; a flow guide unit disposed on an upper side of the dust collecting box, for guiding airflow between the dust collecting spaces and having small cyclones integrally formed therein, for secondarily filtering foreign objects contained in air; an exhaust guider spaced a predetermined distance to an upward direction of the flow guide unit, for guiding the airflow exhausted from the dust collecting box, the exhaust guider having a plurality of discharge holes through which the air filtered by the small cyclones; and an upper cover disposed on the exhaust guider, the dust collecting box and the flow guide unit being formed as a single body.

In another aspect of the present invention, there is provided a dust collection assembly of a vacuum cleaner, including: a dust collecting box having a plurality of partitioned dust collecting spaces for storing foreign objects filtered by cyclone airflow; a flow guide unit disposed on an upper end of the dust collecting box, for guiding airflow between the dust collecting spaces and formed integrally with the dust collecting box; an exhaust guider spaced a predetermined interval above the flow guide unit, for guiding foreign object-free air discharged from the flow guide unit; and an upper cover for covering an upper side of the exhaust guider.

In a further another aspect of the present invention, there is provided a dust collection assembly of a vacuum cleaner, including: a dust collecting box having a first dust collecting space for storing relatively large foreign objects and a second dust collecting space for storing small foreign objects, each of the dust collecting spaces being partitioned; a flow guide unit disposed on an upper end of the dust collecting box, for guiding airflow between the dust collecting spaces and formed integrally with the dust collecting box as one body; a plurality of small cyclones extending from a lower surface of the flow guide unit to the second dust collecting space; an exhaust guider spaced a predetermined interval above the flow guide unit and constituting a predetermined space for airflow together with the flow guide unit, the exhaust guider having holes for guiding foreign object-free air discharged from the flow guide unit; and an upper cover formed on an upper side of the exhaust guider.

According to the present invention, filtering performance of the vacuum cleaner improves. Also, the manufacturing process of the dust collecting unit is performed more conveniently and the construction of the dust collection assembly is simple, so that the manufacturing costs reduces and convenience in the assembling process is enhanced.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

A dust collection assembly filters and collects foreign objects contained in sucked air. The dust collection assembly can be applied to any type vacuum cleaner regardless of a shape of a vacuum cleaner. For example, the dust collection assembly can be mounted in all types of cleaners including a canister type and a upright type, and applied at least to all types of vacuum cleaners for sucking air and separating foreign objects contained in the sucked air using cyclone airflow produced therein.

Figure 1:
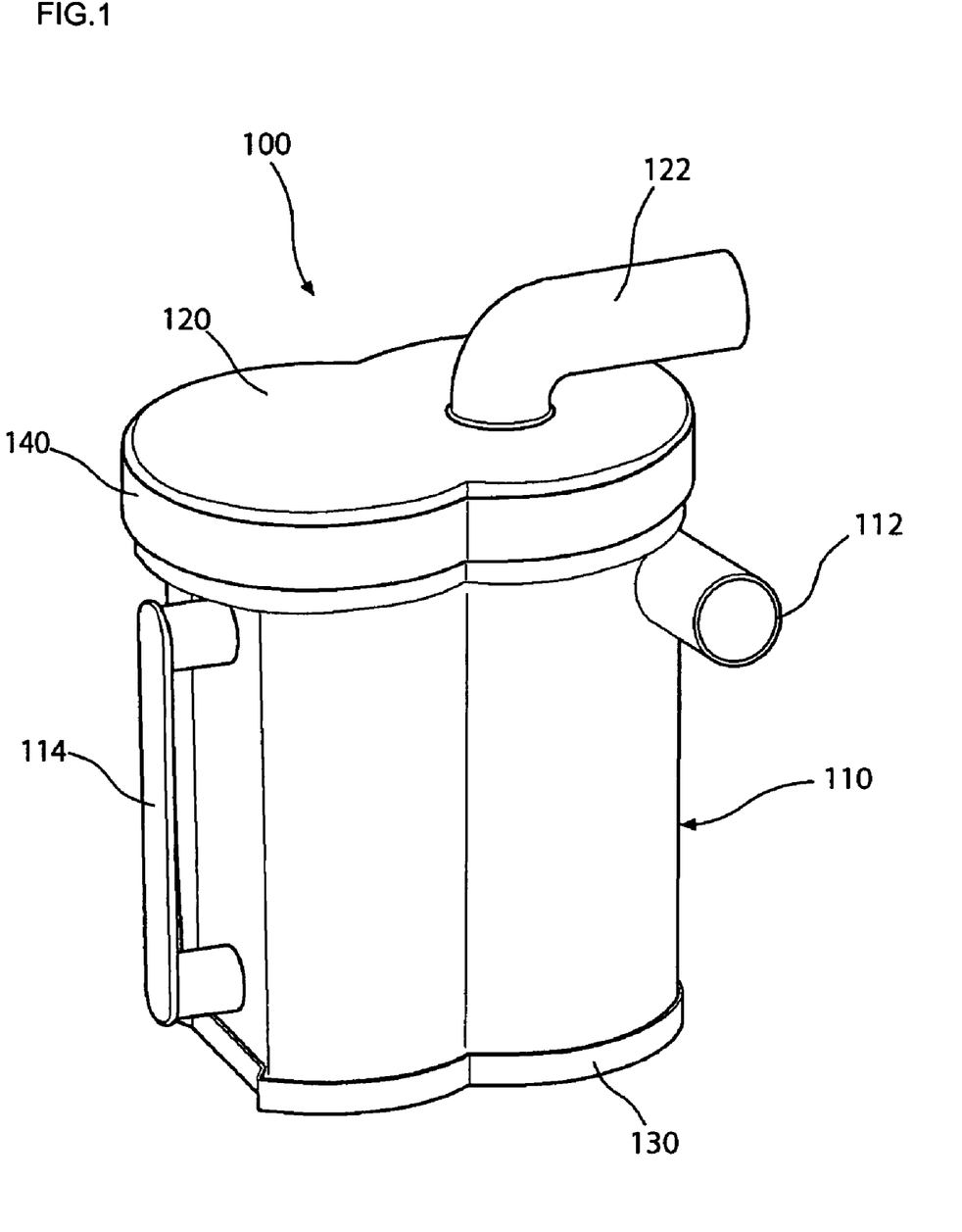
FIG. 1 is a perspective view of an appearance of a dust collection assembly of a vacuum cleaner according to the present invention.
Figure 2:
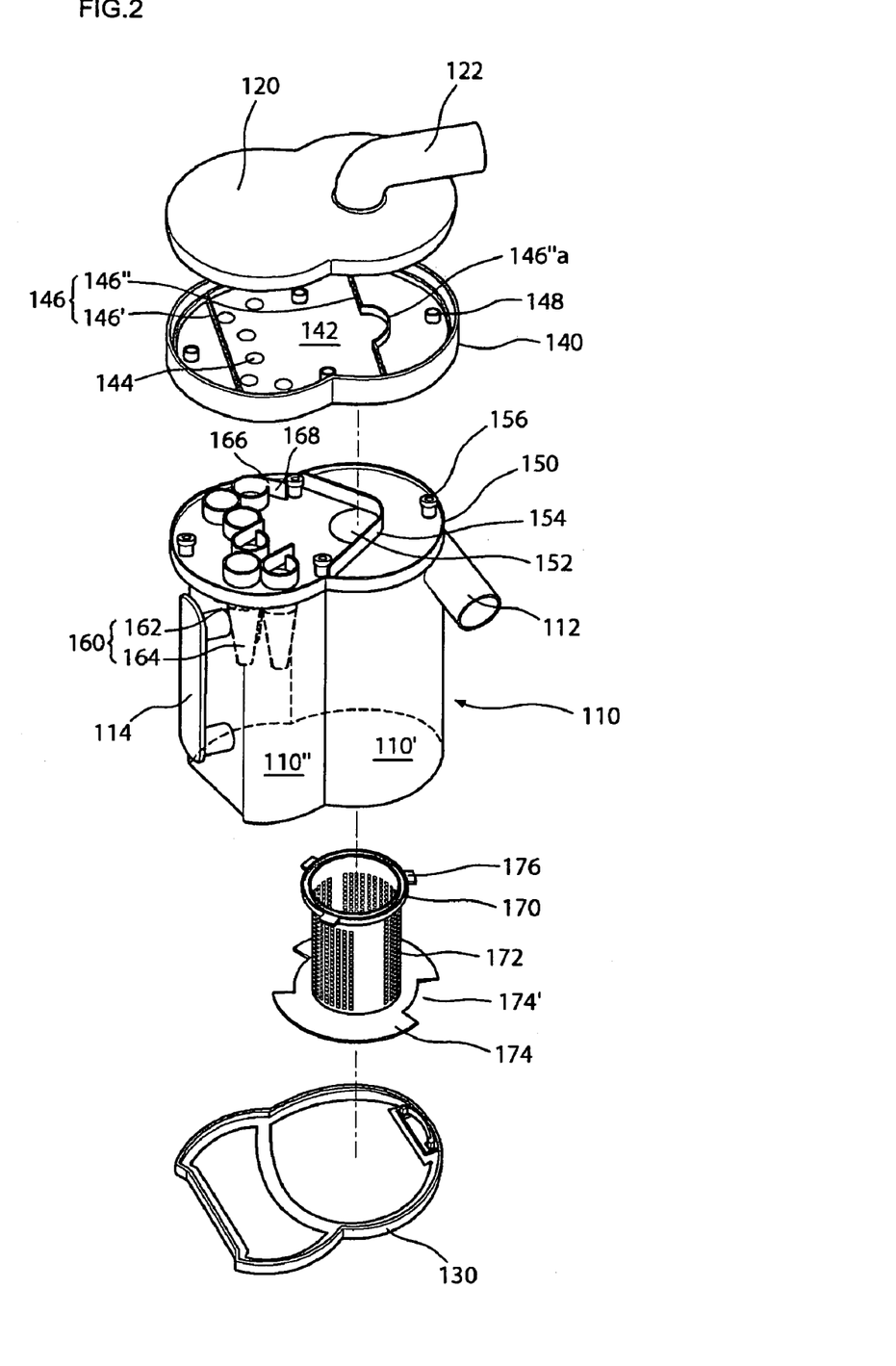
FIG. 2 is an exploded perspective view of a dust collection assembly of a vacuum cleaner according to the present invention.
Figure 3:
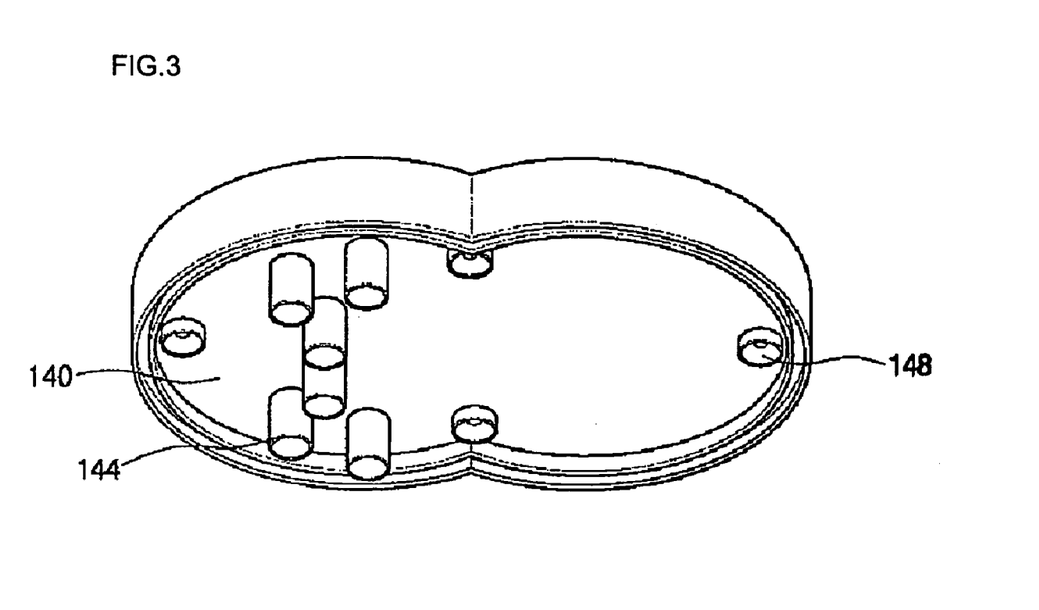
FIG. 3 is a perspective view of the backside of an exhaust guider in a dust collection assembly of a vacuum cleaner according to the present invention.
Figure 4:
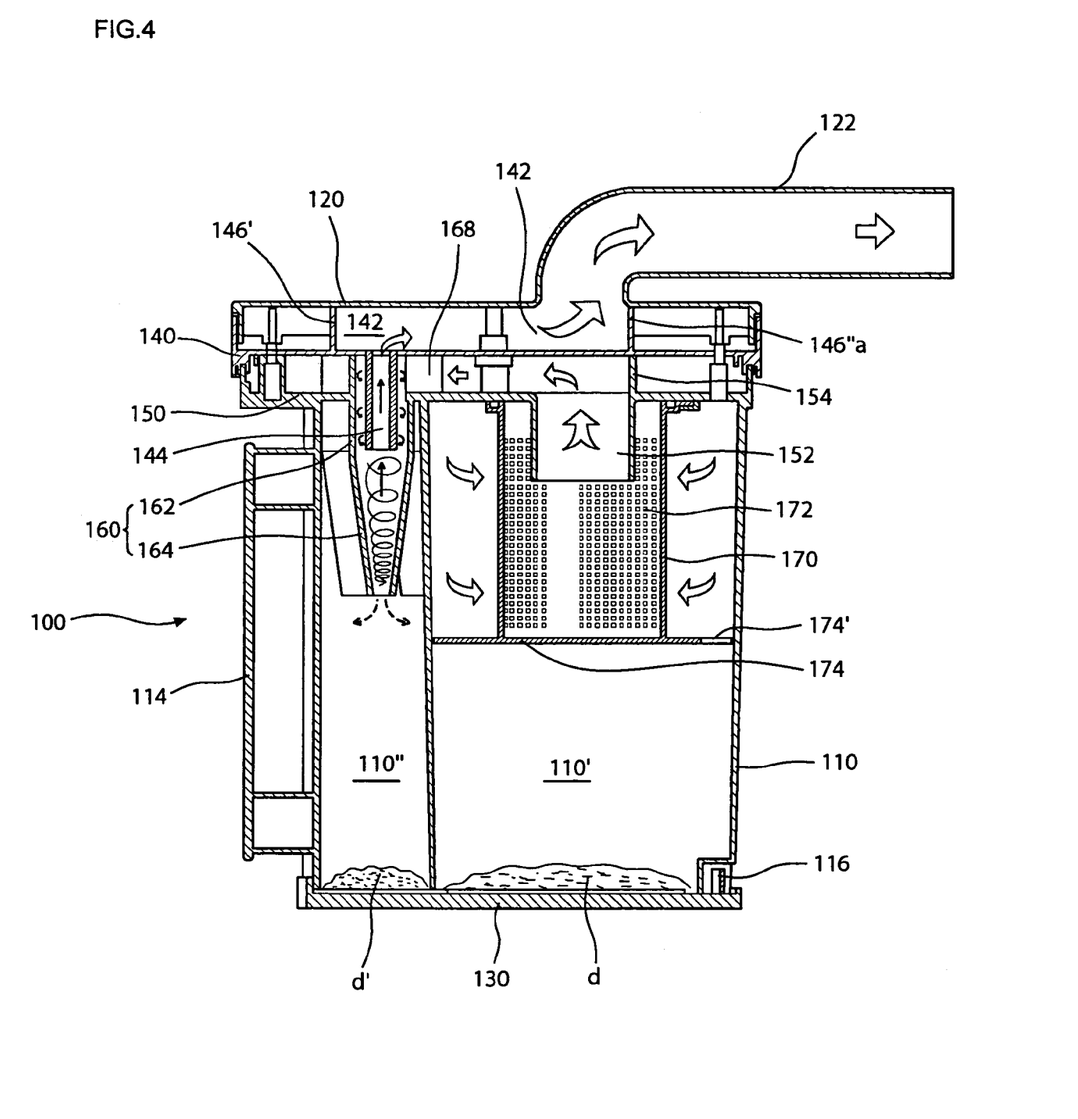
FIG. 4 is a vertical sectional view of a dust collection assembly of a vacuum cleaner according to the present invention.

FIG. 1 is a perspective view of an appearance of a dust collection assembly of a vacuum cleaner according to the present invention, FIG. 2 is an exploded perspective view of a dust collection assembly of a vacuum cleaner according to the present invention, FIG. 3 is a perspective view of the backside of an exhaust guider in a dust collection assembly of a vacuum cleaner according to the present invention, and FIG. 4 is a vertical sectional view of a dust collection assembly of a vacuum cleaner according to the present invention.

As illustrated in the drawings, the dust collection assembly 100 of the present invention includes a dust collecting box 110 having a shape of two overlapped cylinders to form an appearance.

The dust collecting box 110 is partitioned into two spaces to form the first dust collecting space 110' and the second dust collecting space 110". The first and second dust collecting spaces 110' and 110" are serially formed side by side. The first dust collecting space 110' is a part within which the first dust collecting member described later is installed and the second dust collecting space 110" is a part within which the second dust collecting member described later is installed.

The inside of the first dust collecting space 110' has a cylindrical shape. That is, a partition wall 110a partitioning the dust collecting space into the first dust collecting space 110' and the second dust collecting space 110" is formed in the inside of the dust collecting box 110. The partition wall 110a is rounded toward the second dust collecting space 110". Therefore, the cross-section of the first dust collecting space 110' has a circular shape. Also, a flow guide unit 150 described later is integrally formed in the vicinity of the upper end of the dust collecting box 110.

A suction guide 112 is formed in the dust collecting box 110, particularly, at the upper end on one side of the dust collecting box 110 forming the first dust collecting space 110'. The suction guide 112 has one end protruded to the outside of the dust collecting box 110 to allow air flowing into the dust collecting box 110 to flow to a tangential direction along the inner wall of the dust collecting box 110. Therefore, the suction guide 112 has a predetermined portion inclined in the outer surface of the dust collecting box 110.

The dust collecting box 110 has a knob 114 formed on a side thereof. The knob 114 is intended for allowing a user to easily grasp the dust collecting box 110 and protruded from the side portion of the dust collecting box 110.

The dust collecting box 110 has a fastening hinge 116 formed at a lower end on one side thereof. The fastening hinge 116 is a portion to which a lower cover 130 described below is rotatably fastened and may subside a predetermined extent toward the dust collecting box 110.

The dust collecting box 110 has an upper cover 120 formed on an upper side thereof, for forming an upper appearance. The upper cover 120 is formed in a shape that corresponds to the upper end of the dust collecting box 110 and may be detachably installed in the upper end of the dust collecting box 110. The upper cover 120 has an exhaust guide 122. The exhaust guide 122 is protruded to the upper side of the upper cover 120 to guide a discharge of the air filtered by the first and second dust collecting members.

The lower surface of the dust collecting box 110 is shielded by the lower cover 130. The lower cover 130 is detachably installed and formed in a shape that corresponds to the lower end of the dust collecting box 110 to simultaneously open/close the first and second dust collecting spaces 110' and 110".

The lower cover 130 is rotatably installed by the fastening hinge provided in the dust collecting box 110. That is, the right end of the lower cover 130 is hinge-coupled to the fastening hinge 16 and the left end is selectively coupled to the lower end of the dust collecting box 110 by a fastening mechanism (not shown).

Also, the upper cover 120 has an exhaust guider 140 formed in the lower side thereof. The exhaust guider 140 has a shape that corresponds to the upper cover 120 and vertically partitions the upper space of the dust collecting box 110. An exhaust path 142 is formed between the upper cover 120 and the exhaust guider 140. That is, since the exhaust guider 140 is spaced downward a predetermined distance from the upper cover 120, a space of a predetermined size is formed between the exhaust guider 140 and the upper cover 120 to constitute the exhaust path 142.

The exhaust guider 140 has a plurality of discharge holes 143. That is, the plurality of discharge holes 143 vertically pass through the exhaust guider 140. The air filtered by small cyclones 160 described later flows to the upper side of the exhaust guider 140 through the discharge holes 143.

Discharge guide pipes 144 are further formed in the lower portion of the discharge holes 143 of the exhaust guider 140. Referring to FIG. 3, the discharge guide pipe 144 has a cylindrical shape and is protruded in a predetermined length to the lower side of the discharge holes 143. The discharge guide pipe 144 is disposed within the small cyclones 160. Therefore, the discharge guide pipes 144 allow the filtered air to pass through the exhaust guider 140 and flow into the exhaust path 142.

A blocking wall 146 is formed at the left and right on the upper surface of the exhaust guider 140. The blocking wall 146 is formed back and forth to guide airflow and consists of a left blocking wall 146' formed to the left and a right blocking wall 146" formed to the right. The left blocking wall 146' is disposed to the left of the plurality of discharge guide pipes 144 to allow the air guided upward through the discharge guide pipes 144 not to flow to the left any more.

The right blocking wall 146" is intended for allowing the air guided upward through the discharge guide pipes 144 not to flow to the right any more. The right blocking wall 146" further includes a semicircular groove 146"a. The semicircular groove 146"a is formed in a shape that corresponds to the lower end of the exhaust guide 122 to allow the air from the exhaust path 142 to easily flow toward the exhaust guide 122.

Also, the exhaust guider 140 has screw through holes 148 through which screws pass. The screw through holes 148 may be formed at left/right and back/forth of the exhaust guider 140, respectively. The exhaust guider 140 is fastened to the upper cover 120 by the screws.

The exhaust guider 140 has a flow guide unit 150 formed in a lower side thereof, for guiding airflow. The flow guide unit 150 is spaced downward a predetermined distance from the exhaust guider 140 and has a shape that corresponds to the exhaust guider 140. Therefore, a closed predetermined space is formed between the exhaust guider 140 and the flow guide unit 150 and airflows through the closed space.

Referring to FIG. 2, the flow guide unit 150 is integrally formed with the dust collecting box 110. That is, the flow guide unit 150 is integrally formed in the upper end of the dust collecting box 110. The dust collecting box 110 and the flow guide unit 150 may be simultaneously formed by an injection molding. With such a construction, the manufacturing process of the dust collecting unit is performed more simply and conveniently and the manufacturing cost is reduced. Also, since the interval between the two parts disappears, foreign objects do not leak or outside air does not flow in through the interval. Accordingly, dust collecting efficiency improves.

The injection molding is one of plastic molding processes and mainly used for molding thermoplastic resin. Since the injection molding is well known in the art, detailed description thereof will be omitted.

The flow guide unit 150 has a plurality of small cyclones 160 serving as the second dust collecting member. The small cyclones 160 are formed in the left portion of the flow guide unit 150 and filter fine dust using centrifugal force created by a rotating current of fluid.

The small cyclone 160 includes a cylindrical part 162 having a cylindrical shape and a conical part 164 formed in the lower end of the cylindrical part 162 and having a conical shape. The cylindrical part 162 is integrally formed in the flow guide unit 150 and protruded to the upper and lower portions of the flow guide unit 150.

The conical part 164 extends further downward from the lower end of the cylindrical part 162. The conical part 164 has a structure tapering toward the lower side and has an inner structure vertically passing through.

An inlet port 166 to which the air that has passed through the first dust collecting member flows is formed, in a passing through manner, at the upper side end of the cylindrical part 162 of the small cyclone 160. That is, the inlet port 166 is formed at the upper side end of the cylindrical part 162 protruded above the flow guide unit 150, preferably at a portion in which an inlet pipe 152 described later is disposed.

The inlet port 166 has a suction guide piece 168 protruded outward, for guiding airflow. The suction guide piece 168 may be formed at left and right of the inlet port 166 or may be formed on only one side of the inlet port 166 to face the inlet pipe 152.

A discharge guide pipe 144 formed in the exhaust guider 140 is disposed in the inside of the cylindrical part 162 of the small cyclones 160. Therefore, the air that has flowed downward by the small cyclone 160 is guided by the discharge guide pipe 144 and discharged to the upper side of the exhaust guider 140.

The inlet pipe 152 having a predetermined diameter is integrally formed at the right portion of the flow guide unit 150. The flow guide unit 150 is protruded a predetermined length below the flow guide unit 150 to guide the air that has passed through the first dust collecting member to the upper side of the flow guide unit 150.

The flow guide unit 150 further has a flow guide 154 formed on an upper side thereof. The flow guide 154 is protruded upward from the upper surface of the flow guide unit 150 to block dusts and foreign objects so that the air guided to the upper side of the flow guide unit 150 through the inlet pipe 152 and containing dusts may efficiently move to the direction of the inlet port 166 of the small cyclones 160 without being distributed over the entire portion of the flow guide unit 150. Therefore, the flow guide 154 has an about '>' shape when seen from the upper direction and is formed to enclose the upper right side of the inlet pipe 152.

The flow guide unit 150 further has screw fastening parts 156. The screw fastening parts 156 are portions into which screws are fastened and formed at the back/forth and the left/right of the flow guide unit 150, i.e., the positions that correspond to the screw through holes 148 of the exhaust guider 140. Therefore, when one screw passes through and is fastened to the screw fastening part 156 and the screw fastening hole 148, the exhaust guider 140 and the upper cover 120 are coupled to the flow guide unit 150.

In the meantime, a sealing member for preventing air leakage is further provided between the upper cover 120 and the exhaust guider 140, and the exhaust guider 140 and the flow guide unit 150. The sealing member may be formed of an elastic material.

A filter member 170 is installed in a right lower side of the flow guide unit 150. The filter member 170 constitutes the first dust collecting member and primarily filters foreign objects contained in the air flowing from the suction guide 112 of the dust collecting box 110. The filter member 170 has a cylindrical shape and has a plurality of air holes 172. Therefore, the filter member 170 may be formed of an injection-molded material having a plurality of air holes.

The air holes 172 have a predetermined diameter to allow only foreign objects smaller than air to be selectively filtered. That is, foreign objects larger than the air cannot pass through the air holes 172 but fall downward.

The air holes 172 may not be formed in the portion against which the air flowing through the suction guide 112 directly collides. That is, the air holes 172 may not be formed in the portion to which the air flows so that the air flowing to a tangential direction along the inner wall surface of the dust collecting box 110 through the suction guide 112 may not go out through the air holes 172 before rotating.

The filter member 170 is disposed at the center of the first dust collecting member 110' and detachably mounted on the backside of the flow guide unit 150. Therefore, the inlet pipe 152 formed in the flow guide unit 150 is disposed in the upper inner side of the filter member 170.

A separation plate 174 is disposed at the lower end of the filter member 170. The separation plate 174 vertically partitions the first dust collecting space 110' to prevent the foreign objects that has fallen downward from scattering again upward.

A foreign object passing hole 174' is formed at both ends of the separation plate 174 to vertically pass through the separation plate 174. Therefore, the foreign objects in the upper portion fall down through the foreign object passing holes 174'. That is, after the foreign objects contained in the air that has flowed into the inside through the suction guide 112 is filtered by the filter member 170, the foreign objects fall down along the inner wall surface of the dust collecting box 110 while rotating, fall down through the foreign object passing holes 174' to the lower portion, and are accumulated on the lower cover 130.

A plurality of fastening ribs 176 are provided at the upper end of the filter member 170. The fastening ribs 176 allow the filter member 170 to be detachably mounted on the flow guide unit 150. Therefore, though not shown, fixing ribs at which the fastening ribs 176 are hooked and fixed are further formed on the backside of the flow guide unit 150.

Operation of the dust collection assembly will be described below with reference to FIGS. 4 and 5.

Though not shown, when the vacuum cleaner operates, outside air containing foreign objects is sucked through a sucking nozzle and the sucked air containing the foreign objects flows into the first dust collecting space 110' of the dust collecting box 110 through the suction guide 112.

Since the suction guide 112 extends and protrudes to the tangential direction of the dust collecting box 110, the air containing foreign objects that has flowed through the suction guide 112 rotates spirally in the inside of the first dust collecting space 110' of the dust collecting box 110. During the spiral rotation of the air, large foreign objects fall down through the foreign object passing holes 174' and the air containing micro-foreign objects flows into the inside of the filter member 170 through the air holes 172 of the filter member 170.

During the process where the air passes through the air holes 172 of the filter member 170, the large foreign objects 'd' contained in the air are primarily filtered and the air that has passed through the air holes 172 moves to the upper side of the flow guide unit 150 through the inlet pipe 152.

The air that has moved to the upper side of the flow guide unit 150 flows to the left where suction force is produced and flows into the small cyclones 160. At this point, the air is guided by the suction guide piece 168 of the small cyclones 160 and flows into the inside of the cylindrical part 162 of the small cyclone 160 through the inlet port 166.

Since the air that has flowed into the inside of the cylindrical part 162 is supplied to the tangential direction along the sidewall of the cylindrical part 162, the air falls down, circling along the inner wall of the cylindrical part 162. The air moves to the conical part 164 and continues to circle, falling down and reaching to the bottom of the conical part 164.

The air that has reached to the bottom of the conical part 164 is inverted in its center and moves upward. That is, when the air circles and falls down along the inner wall of the conical part 164, an ascending current is produced at the center and the ascending current moves to the exhaust path 142 formed in the upper side of the exhaust guider 140 through the discharge guide pipes 144.

In the meantime, micro-foreign objects 'd'' such as dust particles contained in the air circle and move radially by centrifugal force and are filtered from the air to gather on the wall surface of the conical part 164 and fall down spirally, and is discharged to the lower portion through the lower end (apex) of the conical part 164 and accumulated on the lower cover 130.

The air guided upward through the discharge guide pipes 144 gather in the exhaust path 142 and the air in the exhaust path 142 is discharged to the upper outside through the exhaust guide 122 of the upper cover 120.

Figure 5:
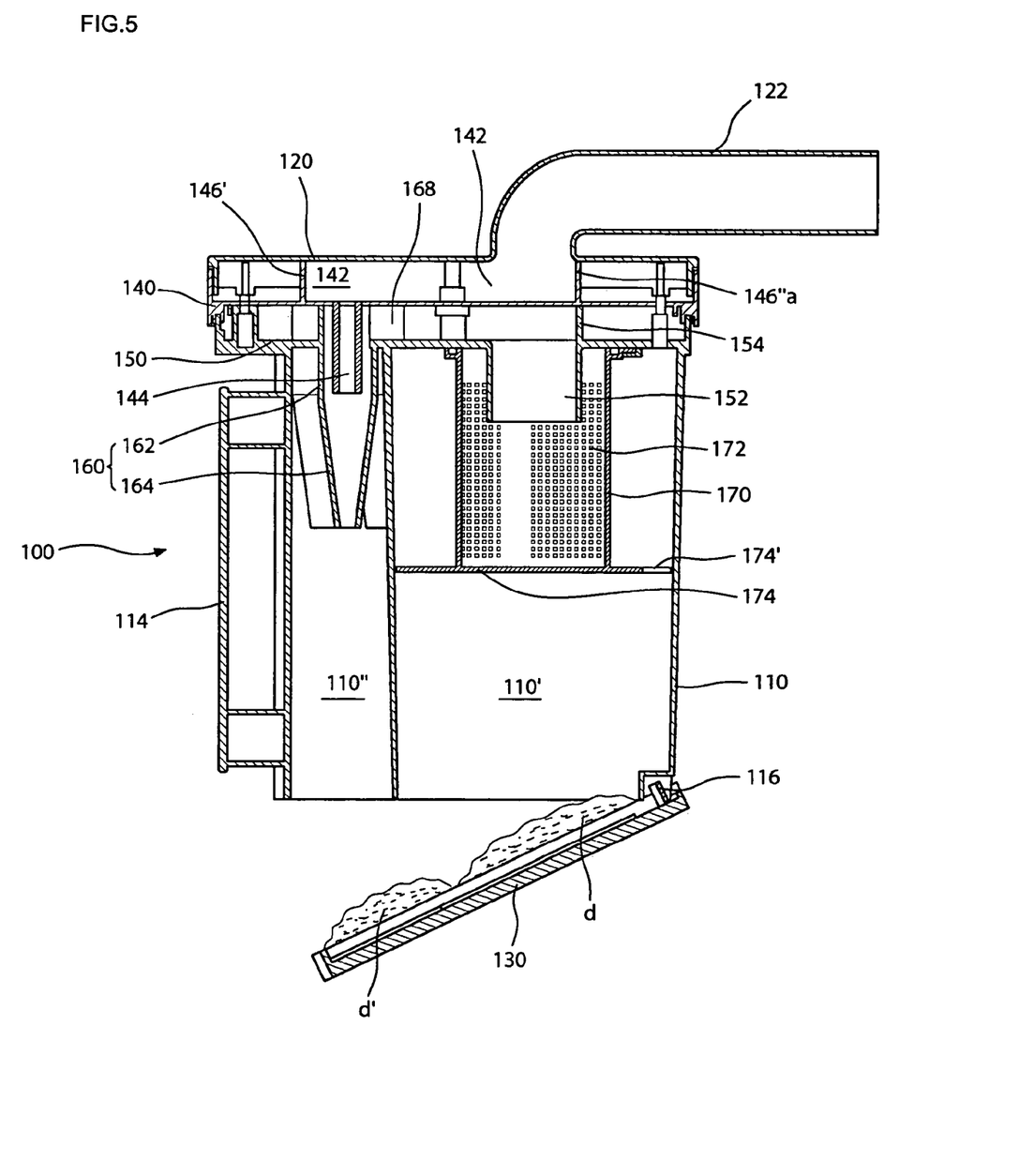
FIG. 5 is a sectional view illustrating foreign objects discharged in a dust collection assembly of a vacuum cleaner according to the present invention.

Next, to remove the dust accumulated on the lower cover 130, the lower cover 130 should be opened, which is illustrated in FIG. 5.

At this point, a fastening mechanism (not shown) provided at the left end of the lower cover 130 is released so that the lower cover may be opened. The lower cover 130 pivots downward at a fastening hinge 116 disposed at the right end to discharge downward the foreign objects 'd' and 'd'' accumulated on the lower cover 130.

In the meantime, the foreign objects (dusts) are partially attached and accumulated on the separation plate 174. The foreign objects can be removed after the filter member 170 is separated from the flow guide unit 150.

In detail, the filter member 170 can be separated by rotation. That is, since the fastening ribs 176 of the filter member 170 are hooked at the fixing ribs (not shown) of the flow guide unit 150, the fastening ribs 176 are detached from the fixing ribs by rotating the filter member 170 in one direction and thus the filter member 170 is separated.

When the filter member 170 is separated, it is possible to wash the filter member 170 using water. That is, since the filter member 170 is made of an injection-molded material, it is possible to remove the foreign objects in the air holes 172 and the foreign objects attached on the separation plate 174 using water.

Also, since the flow guide unit 150 and the dust collecting box 110 are integrally formed, the exhaust guider 140 and the upper cover 120 are separated from the flow guide unit 150 in order to separate the exhaust guider 140 and the upper cover 120 from the dust collecting box 110. That is, since the upper cover 120 and the exhaust guider 140 are coupled with the flow guide unit 150 by a single screw to constitute one assembly, the upper cover 120 and the exhaust guider 140 are simultaneously separated by releasing the screws (not shown) fastened to the screw fastening parts 156 of the flow guide unit 150.

In the meantime, the flow guide unit 150 is formed as one body in the dust collecting box 110. Further, other elements integrally formed in the flow guide unit 150 are simultaneously formed during the manufacturing process of the dust collecting box 110. In detail, the small cyclones 160 in which cyclone airflows of small diameters are produced, the suction guide piece 168 for guiding the sucked air to the small cyclones 160, and the flow guide 152 for guiding the air discharged from the inlet pipe 152 to the small cyclones 160, are formed at a time while the dust collecting box 110 is formed.

Though the second dust collecting member is provided to the left side of the first dust collecting member in the above embodiment, the second dust collecting member may be disposed to the right or the back/forth of the first dust collecting member, of course. Further, the second dust collecting member may not be concentrated on one side but divided and scattered around the first dust collecting member.

Also, though the filter member 170 consists of the injection-molded material having the plurality of air holes 172 in the above embodiment, other molding methods or a filter member 170 having other construction can be readily applied as far as the function of filtering the foreign objects is provided. That is, a variety of filters having the function of filtering the foreign objects contained in the air, such as a general bent filter having a wrinkled shape or a multi-filter having a plurality of layers can be used. Also, the material of the filter can be modified in various ways.

Also, the exhaust guider 140 and the upper cover 120 are fastened to the flow guide unit 150 by a screw in the above embodiment, but it is also possible to fasten the upper cover 120, the exhaust guider 140, and the flow guide unit 150 using other fastening member other than the screw.

According to the dust collection assembly, since the first dust collecting member for primarily filtering the foreign objects contained in the air and the second dust collecting member for secondarily filtering the foreign objects contained in the air are serially provided in plurality when seen from the airflow direction, the foreign objects contained in the air can be removed more effectively and the removing efficiency of the foreign objects is enhanced even more.

Also, according to the present invention, the plurality of discharge guide pipes are integrally formed in the flow guide unit. Therefore, the assembly efficiency improves compared with the case where the discharge guide pipes and the small cyclones are separately installed. Resultantly, since the approximate whole structure of the dust collecting box is completed by the structure such that the flow guide unit and the exhaust guider are separately disposed, the assembling process can be efficiently performed.

Here, the flow guide unit is disposed on the upper side of the dust collecting box to operate as the passage connection portion between the large-diameter cyclone and the small-diameter cyclone in the inside of the dust collecting box, and the exhaust guider is disposed on the upper side of the flow guide unit to guide the air exhausted after the foreign objects have been completely filtered by the cyclone airflow.

Also, according to the present invention, the blocking wall and the flow guide for guiding the airflow are integrally formed on the upper surface of the exhaust guider and the flow guide unit. Therefore, the airflow is effectively guided and the airflow path is shortened, which prevents deterioration in the suction force of the vacuum cleaner.

Also, since the dust collecting box and the flow guide unit are integrally formed by the injection molding, job efficiency improves.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A dust collection assembly of a vacuum cleaner comprising:
    a dust collecting box having a first dust collecting space and a second dust collecting space for collecting foreign objects therein;
    a filter disposed in an inside of the first dust collecting space, for primarily filtering foreign objects during cyclone airflow in the first dust collecting space;
    a flow guide unit disposed on an upper side of the dust collecting box, for guiding airflow between the dust collecting spaces and having cyclone members integrally formed therein, for secondarily filtering foreign objects contained in air;
    an exhaust guider spaced a predetermined distance to an upward direction of the flow guide unit, for guiding the airflow exhausted from the dust collecting box, the exhaust guider having a plurality of discharge holes through which the air filtered by the cyclone members; and
    an upper cover disposed on the exhaust guider, wherein the dust collecting box and the flow guide unit are integrally formed as a single body.

2. The dust collection assembly according to claim 1, wherein the cyclone members comprises:
    a cylindrical part formed to vertically pass through the flow guide unit; and
    a conical part extending downward from a lower end of the cylindrical part.

3. The dust collection assembly according to claim 1, wherein the flow guide unit has an inlet pipe protruded downward, for guiding upward air that has passed through the filter.

4. The dust collection assembly according to claim 1, wherein the flow guide unit has a flow guide protruded thereon, for guiding air guided to an upper side of the flow guide unit to one direction.

5. The dust collection assembly according to claim 1, further comprising a partition wall for partitioning the dust collecting space into the first and second dust collecting spaces.

6. The dust collection assembly according to claim 5, wherein the partition wall makes the first dust collecting space circular.

7. The dust collection assembly according to claim 1, wherein the exhaust guider has discharge guide pipes formed therebelow and extending to an inner space of the cyclone members.

8. A dust collection assembly of a vacuum cleaner comprising:
    a dust collecting box having a plurality of partitioned dust collecting spaces for storing foreign objects filtered by cyclone airflow;
    a flow guide unit disposed on an upper end of the dust collecting box, for guiding airflow between the dust collecting spaces and formed integrally with the dust collecting box;
    an exhaust guider spaced a predetermined interval above the flow guide unit, for guiding foreign object-free air discharged from the flow guide unit;
    an upper cover for covering an upper side of the exhaust guider; and
    an exhaust path formed between the upper cover and the exhaust guider.

9. A dust collection assembly of a vacuum cleaner comprising:
    a dust collecting box having a first dust collecting space for storing relatively large foreign objects and a second dust collecting space for storing small foreign objects, each of the dust collecting spaces being partitioned;
    a flow guide unit disposed on an upper end of the dust collecting box, for guiding airflow between the dust collecting spaces and formed integrally with the dust collecting box as one body;
    a plurality of cyclone members extending from a lower surface of the flow guide unit to the second dust collecting space;
    an exhaust guider spaced a predetermined interval above the flow guide unit and constituting a predetermined space for airflow together with the flow guide unit, the exhaust guider having holes for guiding foreign object-free air discharged from the flow guide unit;

an upper cover formed on an upper side of the exhaust guider; and an exhaust path formed between the upper cover and the exhaust.

10. The dust collection assembly according to claim 9, further comprising a filter detachably fixed on an upper side of the first duct collecting space.

11. The dust collection assembly according to claim 9, wherein the first and second dust collecting spaces are partitioned left and right.

12. The dust collection assembly according to claim 9, wherein an upper end of the cyclone members contacts a lower surface of the exhaust guider.

13. The dust collection assembly according to claim 9, wherein the cyclone members have an open end facing the first dust collecting space.

14. The dust collection assembly according to claim 9, wherein the dust collecting spaces are partitioned so that a cross-section of the first dust collecting space is circular.

15. The dust collection assembly according to claim 9, wherein the cyclone members are integrally formed with the flow guide unit.

16. The dust collection assembly according to claim 9, wherein the exhaust guider has discharge guide pipes formed therebelow and extending to an inner space of the cyclone members.

17. The dust collection assembly according to claim 9, wherein the discharge guide pipes are integrally formed with the exhaust guider.

* * * * *